(12) United States Patent
Koizumi et al.

(10) Patent No.: US 11,560,672 B2
(45) Date of Patent: Jan. 24, 2023

(54) METHODS FOR DEINKING UV PRINTS

(71) Applicant: NIPPON PAPER INDUSTRIES CO., LTD., Tokyo (JP)

(72) Inventors: Hirohiko Koizumi, Tokyo (JP); Masato Takayama, Tokyo (JP); Seiki Yoneshige, Tokyo (JP); Shisei Goto, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 24 days.

(21) Appl. No.: 17/042,506

(22) PCT Filed: Feb. 21, 2019

(86) PCT No.: PCT/JP2019/006446
§ 371 (c)(1),
(2) Date: Sep. 28, 2020

(87) PCT Pub. No.: WO2019/187823
PCT Pub. Date: Oct. 3, 2019

(65) Prior Publication Data
US 2021/0025113 A1    Jan. 28, 2021

(30) Foreign Application Priority Data
Mar. 29, 2018 (JP) .............................. JP2018-065233

(51) Int. Cl.
*D21C 5/00* (2006.01)
*D21C 5/02* (2006.01)
*D21B 1/32* (2006.01)

(52) U.S. Cl.
CPC ............. *D21C 5/025* (2013.01); *D21B 1/327* (2013.01)

(58) Field of Classification Search
CPC ................................ D21C 5/025; D21B 1/327
See application file for complete search history.

(56) References Cited

U.S. PATENT DOCUMENTS

| | | | |
|---|---|---|---|
| 4,440,635 A * | 4/1984 | Reiniger | ................ D21B 1/322 241/86.1 |
| 2002/0066880 A1 | 6/2002 | Robinson et al. | |
| 2002/0096269 A1 | 7/2002 | Bouchette et al. | |

(Continued)

FOREIGN PATENT DOCUMENTS

| | | |
|---|---|---|
| EP | 1652999 A1 | 5/2006 |
| EP | 1860232 A1 | 11/2007 |

(Continued)

OTHER PUBLICATIONS

International Search Report for PCT/JP2019/006446, dated May 14, 2019, 4 pages.

(Continued)

*Primary Examiner* — Jacob T Minskey
(74) *Attorney, Agent, or Firm* — Nixon & Vanderhye P.C.

(57) ABSTRACT

The present invention aims to develop a technique for efficiently preparing deinked pulp from prints made with UV-curable inks. According to the processes for preparing deinked pulp of the present invention, high quality deinked pulp can be obtained by performing the steps of: disintegrating printed waste paper containing UV prints in water to give a waste paper slurry; and applying a mechanical process to the waste paper slurry using a rotary disintegrator.

7 Claims, 1 Drawing Sheet

(56) References Cited

U.S. PATENT DOCUMENTS

2007/0158039 A1    7/2007   Hale et al.
2009/0165967 A1    7/2009   Rosencrance et al.
2011/0108221 A1    5/2011   Cotter et al.
2017/0362774 A1   12/2017   Fukuoka et al.

FOREIGN PATENT DOCUMENTS

| | | |
|---|---|---|
| JP | H08-226087 | 9/1996 |
| JP | H10-149473 | 6/1998 |
| JP | 2000-034685 | 2/2000 |
| JP | 2005-520057 | 7/2005 |
| JP | 2005-345208 | 12/2005 |
| JP | 2007-119955 | 5/2007 |
| JP | 2007-314894 | 12/2007 |
| JP | 2008-121163 | 5/2008 |
| JP | 2009-221636 | 10/2009 |
| JP | 2017-190539 | 10/2017 |
| JP | 2017179614 A | 10/2017 |
| JP | 2018-009263 | 1/2018 |
| JP | 2018-071020 | 5/2018 |
| WO | 2016/104675 | 6/2016 |

OTHER PUBLICATIONS

Extended European Search Report of EP19774328.9 dated Nov. 15, 2021, 8 pages.

\* cited by examiner

METHODS FOR DEINKING UV PRINTS

This application is the U.S. national phase of International Application No. PCT/JP2019/006446 filed 21 Feb. 2019, which designated the U.S. and claims priority to JP Patent Application No. 2018-065233 filed 29 Mar. 2018, the entire contents of each of which are hereby incorporated by reference.

TECHNICAL FIELD

The present invention relates to a technique for deinking printed materials to prepare deinked pulp. In particular, the present invention relates to a technique for deinking waste paper stocks containing prints made by UV printing (UV prints) to prepare deinked pulp. According to the present invention, high quality deinked pulp can be prepared efficiently from UV prints that are hard to deink.

BACKGROUND ART

Recently, the use of waste paper has been expanding in view of resource conservation or environmental issues. On the other hand, the quality and variety of prints have increased so that hard-to-recycle printed waste papers such as prints made by UV printing and prints coated with resin films are frequently mixed in printed materials collected as waste paper.

If these prints are used as raw materials to prepare deinked pulp (DIP), some problems may occur such as impaired runnability of the production process or degraded quality of the resulting recycled paper (NPL 1). Approaches for preparing pulp from waste paper stocks containing such hard-to-recycle printed materials involve applying a high mechanical load to the waste paper stocks or using a lot of chemicals, which cause another problem such as degradation of fibers or cost increase.

Attempts have been made to sort out and eliminate these hard-to-recycle printed materials as prohibitive materials from waste paper stocks. However, it is difficult to visually discriminate prints finished with UV-curable clear coatings, for example, because they are made to be visually similar to prints finished with conventional water-based clear coatings. Thus, a technique for identifying printed materials has been proposed in JPA 1998-149473 (PTL 1), which relates to a method for identifying banknotes and the like using a Fourier transform near-infrared analyzer (FT-NIR). Further, JPA 2005-345208 (PTL 2) proposes a method for sorting out printed materials that are hard to recycle as waste paper stocks based on the solubility of the printed surface of the printed materials in solvents.

An alternative approach has also been proposed to deink waste paper stocks efficiently by using a specially designed deinking agent. For example, JPA 2007-119955 (PTL 3) describes deinking them efficiently by adding a polyethylene glycol-based nonionic surfactant having a cloud point of 0 to 25° C. to a pulper. Further, JPA 2005-520057 (PTL 4) proposes to effectively remove inks from pulp fibers by using a set of deinking agents having different cloud points.

The use of an anionic surfactant as a deinking agent has also been proposed. For example, JPA 2007-314894 (PTL 5) and JPA 2009-221636 (PTL 6) propose to use a combination of a nonionic surfactant and an anionic surfactant for deinking.

CITATION LIST

Patent Literature

PTL 1: JPA 1998-149473
PTL 2: JPA 2005-345208
PTL 3: JPA 2007-119955
PTL 4: JPA 2005-520057
PTL 5: JPA 2007-314894
PTL 6: JPA 2009-221636

Non Patent Literature

NPL 1: "Survey Report on Materials Subject to Recyclability Test in Waste Paper Recycling" (published by Paper Recycling Promotion Center).

SUMMARY OF INVENTION

Technical Problem

Under the circumstances described above, the present invention aims to provide a technique for preparing deinked pulp from hard-to-deink waste paper stocks such as UV prints.

Solution to Problem

As a result of careful studies to solve the problems described above, we found that pulp can be deinked efficiently by applying a mechanical process using a rotary disintegrator, and thus accomplished the present invention.

The present invention includes, but not limited to, the following embodiments.
(1) A process for preparing a deinked pulp, comprising the steps of: disintegrating printed waste paper containing UV prints in water to give a waste paper slurry; and applying a mechanical process to the waste paper slurry using a rotary disintegrator.
(2) The process of (1), comprising removing inks to the outside by flotation before the step of applying a mechanical process.
(3) A process for making paper, comprising converting a raw material containing the deinked pulp prepared by the process of (1) or (2) into paper.

Advantageous Effects of Invention

According to the present invention, hard-to-recycle printed materials can be deinked efficiently to prepare deinked pulp. The technique of the present invention allows for preparing high quality deinked pulp from hard-to-recycle printed materials, whereby printed waste papers that were conventionally eliminated as prohibitive materials and could not be used as raw materials for deinked pulp can be effectively used as resources.

DESCRIPTION OF EMBODIMENTS

Figure 1:
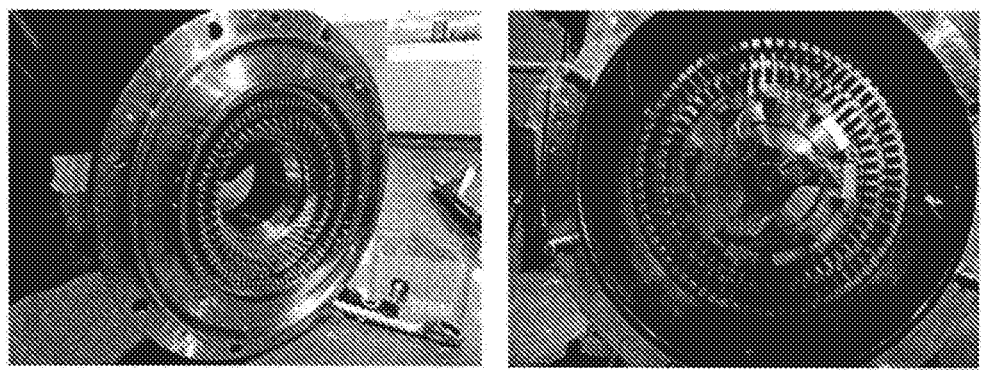
FIG. 1 shows photographs illustrating an embodiment of disc-like cutting blades of a rotary disintegrator (left: stationary blades; right: rotating blades).
Figure 2:
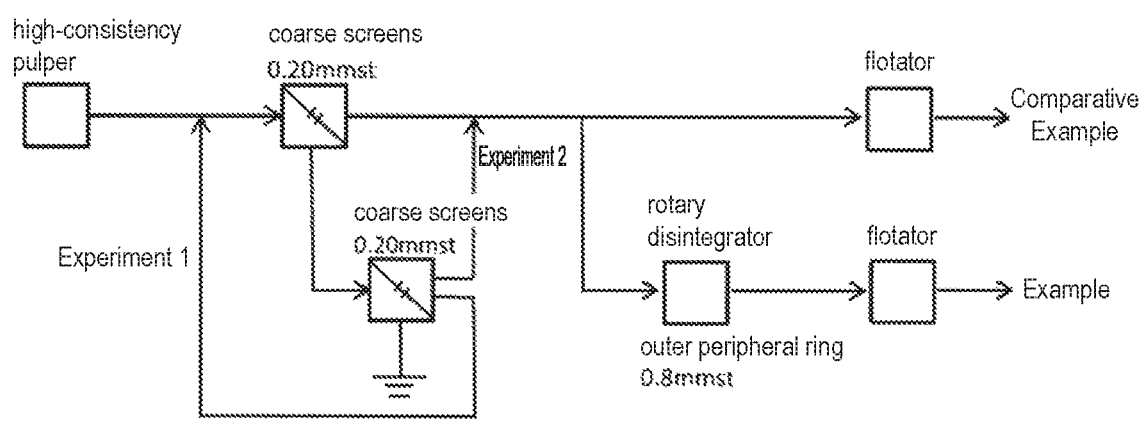
FIG. 2 shows a schematic diagram illustrating an embodiment of a process for preparing deinked pulp from waste paper stocks.

The present invention relates to a technique for deinking wastepaper stocks to prepare deinked pulp (DIP). The present invention also relates to a technique for making recycled paper by using deinked pulp obtained by deinking waste paper stocks.

In the present invention, printed materials are used as waste paper stocks. Printed materials that can be used are not specifically limited so far as they comprise a substrate including paper that has been printed on, and the present invention can be applied to, for example, printed materials comprising a paper covered with a film or the like that has been printed on, printed materials comprising a coated paper that has been printed on, printed materials comprising an uncoated paper that has been printed on, and the like. Specifically, the present invention can be applied to waste papers such as newsprint papers, mechanical papers, wood-free papers, coated papers, lightweight coated papers, heat-sensitive recording papers, carbonless copying papers, colored woodfree papers, papers for plain paper copiers (papers for toner printing), paper containers, stickers and labels, ledger papers, corrugated fiberboards, white paperboards and the like that have been printed on, and the present invention can also be applied to glossy prints and prints treated on their surface with an overprint varnish or a UV-curable clear coating or the like.

Waste papers that have been printed on by any printing method can be used as printed materials to which the present invention is applied, and printed materials suitable for preparing deinked pulp or recycled paper can be sorted out by the present invention. Printing methods used for the printed materials include, for example, UV printing with UV-curable inks, hybrid UV-curable inks, highly sensitive UV-curable inks and the like; relief printing such as flexographic printing; intaglio printing such as gravure printing; lithographic printing such as offset printing; stencil printing such as screen printing (silkscreen printing); electrostatic printing using electrostatic forces (toner printing); inkjet printing and laser printing widely used in printers for personal computers, etc. Inks used for printing are not specifically limited either, and prints made with any coloring materials used in various printing methods can be used. For example, UV printing is a printing method according to which an ink is cured/fixed by UV light, and the resulting UV prints are known as hard-to-deink printed materials and sometimes eliminated as prohibitive materials and prevented from being mixed into feed streams to the preparation process of deinked pulp. According to the present invention, deinked pulp can be prepared from even such UV prints. Moreover, highly sensitive UV-curable inks that are easier to recycle than hybrid UV-curable inks and conventional UV-curable inks have recently been developed and used to improve the recyclability of UV prints and/or to reduce the energy consumption for UV printing, and prints made with such highly sensitive UV-curable inks can also be deinked by the present invention. It should be noted that highly sensitive UV-curable inks as used herein refer to UV-curable inks that can be applied to printing methods using the so-called energy-efficient UV curing systems, hybrid UV curing systems, LED-UV curing systems and the like.

As used herein, the term "deinked pulp (DIP)" refers to a pulp recycled by removing printing inks and the like from printed materials, and it is typically obtained by disintegrating printed materials into a slurry and removing inks using a mechanical stress and chemicals such as deinking agents. Printed materials used as raw materials include, for example, newspapers, leaflets, magazines, books, office papers, enveloped letters, heat-sensitive papers, carbonless copying papers, corrugated fiberboards, white paperboards, printed papers produced by copiers or office automation equipment and the like. Printed materials containing adhesive materials such as pressure-sensitive adhesives, other adhesives, pressure-sensitive adhesive tapes, and bookbinding glue on the spines of magazines, or coatings or laminates of resins or the like can also be used as printed materials of the present invention. Further, the printed materials may contain inorganic particles known as ashes. Ashes refer to inorganic particles in general, such as fillers and pigments incorporated into or coated on a paper during the production process and remaining after incineration of the paper. For example, they include, but not limited to, calcium carbonate, talc, kaolin, titanium dioxide and the like.

In the present invention, deinked pulp can be prepared by using wastepaper stocks containing printed materials. Methods for preparing deinked pulp are not specifically limited, and commonly known methods can be adopted. To deink printed materials in the present invention, known deinking equipment and deinking agents can be used. Examples of equipment used in the deinking process may include, for example, kneaders, dispersers, flotators and the like. Examples of deinking agents include, but not limited to, known surfactants, e.g., nonionic surfactants, anionic surfactants, cationic surfactants and amphoteric surfactants such as fatty acid salts, higher alkyl sulfates, alkylbenzene sulfonates, higher alcohols, alkyl phenols, alkylene oxide adducts of fatty acids or the like; and organic solvents, proteins, enzymes, natural polymers, synthetic polymers and the like. It should be understood that a one-component system or a mixture of two or more components can be used as a deinking agent. For example, one embodiment of the preparation of deinked pulp can comprise a disintegration process in which waste paper is disintegrated by adding an alkaline chemical or a surfactant; an ink detaching process in which inks are detached from pulp under mechanical shear and alkaline conditions; a flotation process and/or a washing process in which the inks separated from pulp are removed, etc. Optionally, inks may be further detached from pulp by adding an alkaline chemical or a surfactant (an alkaline immersion process or an aging process) after the pulp is dewatered to adjust the pulp consistency at 10 to 35% by mass, or the inks may be removed by an additional flotation process or washing process, for example. Further, a decontamination step (detrashing step) may be included to remove contaminants.

In the present invention, the step of detaching inks adhered to pulp fibers by applying mechanical shear is sometimes referred to as "deinking step", and the step of removing the detached inks to the outside is sometimes referred to as "ink removal step".

Mechanical Process Using a Rotary Disintegrator

In the present invention, a mechanical process is applied to a waste paper slurry using a rotary disintegrator. Specifically, a mechanical process is applied to a waste paper slurry by introducing it into disc-like or conical cutting blades with narrow slots rotating at high speed. The disintegrator used in the present invention is not specifically limited so far as it is a rotary type, and examples of such equipment include Finer, Conifiner, TopFiner, SevenFiner, ConiDisc, deflakers, conical deflakers, Power Finer and the like. It should be noted that kneaders and pulpers are also known as disintegrators, but are not included in the rotary disintegrators according to the present invention because they are not the rotary type.

In the present invention, a mechanical process is applied to a waste paper slurry using a rotary disintegrator. The speed of the mechanical process (i.e., the throughput per hour) is, for example, 200 m³/h or less, preferably 1 to 170 m³/h, more preferably 10 to 140 m³/h, still more preferably 20 to 100 m³/h.

The rotary disintegrator is an apparatus capable of mechanically processing a waste paper slurry through cutting blades with narrow slots rotating at high speed. Feedstocks supplied into it can be deinked efficiently with reduced damage of fibers by the hydrodynamic impact waves generated by the cutting blades with narrow slots rotating at high speed. In preferred embodiments, the rotary disintegrator comprises stationary blades and rotating blades, so that inks can be detached/pulverized from a waste paper pulp by the rotating blades rotating at high speed when a feed stream passes between the stationary blades and the rotating blades. In preferred embodiments, the blade width of the rotating blades is 1.0 to 10 mm, more preferably 1.2 to 5.0 mm, still more preferably 1.4 to 4.5 mm, or may be 2.0 to 4.5 mm. In preferred embodiments, the blade width of the stationary blades is 0.3 to 2.0 mm, more preferably 0.4 to 1.7 mm, still more preferably 0.5 to 1.4 mm, or may be 0.6 to 1.1 mm.

The solids content of the wastepaper slurry is, for example, 0.01 to 15.0% by weight, preferably 0.1 to 10.0% by weight, more preferably 0.5 to 5.0% by weight, still more preferably 0.8 to 5.0% by weight, further more preferably 1.0 to 4.0% by weight. Further, the slurry desirably has an alkaline pH, because higher amounts of OH active radicals are produced. In the present invention, the temperature of the mechanical process is not specifically limited, but preferably 5 to 80° C., especially preferably 10 to 70° C.

In the present invention, the required energy can be reduced by adding a surfactant. Surfactants that may be used include known or novel surfactants, e.g., nonionic surfactants, anionic surfactants, cationic surfactants and amphoteric surfactants such as fatty acid salts, higher alkyl sulfates, alkylbenzene sulfonates, higher alcohols, alkyl phenols, alkylene oxide adducts of fatty acids or the like. These may be used as a one-component system or a mixture of two or more components.

Making of Paper

In the present invention, paper can be made by using deinked pulp obtained as described above. Papermaking methods are not specifically limited, and commonly known methods can be adopted.

In the papermaking methods of the present invention, paper need not be made by using a deinked pulp obtained by the present invention alone, but paper may be made by also using other pulps in any proportions as feedstock pulps.

In the present invention, paper may be made by also using other pulps including, for example, deinked pulp (DIP); softwood or hardwood kraft pulp (NKP or LKP); softwood or hardwood-based mechanical pulp such as groundwood pulp (GP), refiner groundwood pulp (RGP), thermomechanical pulp (TMP), chemithermomechanical pulp (CTMP), chemigroundwood pulp (CGP), or semichemical pulp (SCP); waste paper pulp produced by disintegrating corrugated fiberboards; coated broke pulp produced by disintegrating broke including coated papers or coating base papers or other papers; and mixtures of two or more of these pulps.

Further in the present invention, chemicals or fillers may be added during the process of making paper from pulp. Chemicals that can be added include sizing agents such as rosin emulsions or neutral rosins, alkyl ketene dimers, alkenyl succinic anhydrides, and styrene-acrylic copolymers; resins including cationic, zwitterionic or anionic polyacrylamides, polyvinylamines, and polyacrylic acids; dry paper strength additives such as guar gum; wet paper strength additives such as cationically, zwitterionically or anionically modified starches, polyamidoamine-epichlorohydrin, and carboxymethyl cellulose; drainage aids, colorants, dyes, fluorescent dyes, coagulants, bulking agents, retention aids, etc. Fillers may be any particles commonly known as inorganic fillers and organic fillers and are not specifically limited. Specifically, inorganic fillers include calcium carbonate (precipitated calcium carbonate, ground calcium carbonate, synthetic calcium carbonate), magnesium carbonate, barium carbonate, aluminum hydroxide, calcium hydroxide, magnesium hydroxide, zinc hydroxide, clay (kaolin, calcined kaolin, delaminated kaolin), talc, zinc oxide, zinc stearate, titanium dioxide, various forms of silica prepared from sodium silicate and a mineral acid (white carbon black, silica/calcium carbonate complexes, silica/titanium dioxide complexes), terra alba, bentonite, diatomaceous earth, calcium sulfate, inorganic fillers recycled from the ash produced in the deinking process and inorganic fillers formed during recycling as complexes with silica or calcium carbonate, etc. Calcium carbonate-silica complexes include not only calcium carbonate and/or precipitated calcium carbonate-silica complexes but also complexes with amorphous silica such as white carbon black. Among them, typical fillers in neutral and alkaline papermaking such as calcium carbonate or precipitated calcium carbonate-silica complexes are preferably used.

The paper made by the present invention can be used as, but not limited to, printing papers and newsprint papers as well as coated papers, information recording papers, converting papers, sanitary papers and the like, for example. Information recording papers more specifically include xerographic papers, ink jet recording papers, heat-sensitive recording media, papers for business forms and the like. Converting papers more specifically include base papers for release papers, base papers for laminated boards, base papers for molding purposes and the like. Sanitary papers more specifically include facial tissues, toilet papers, paper towels and the like. They can also be used as paperboards such as base papers for corrugated fiberboards. Further, they can be used as base papers for papers having a pigment-containing coating layer such as coated papers, information recording papers, converting papers and the like.

EXAMPLES

The present invention will be further illustrated with reference to specific experimental examples, but the present invention is not limited to these specific examples. Unless otherwise specified herein, the numerical ranges are described to include their endpoints, and the concentrations and the like are based on weight.

Experiment 1

A deinked pulp was prepared by the procedure described below using printed waste paper containing prints made with UV-curable inks (i.e., colored woodfree waste paper from Matsuoka Resources) as a raw material and made into paper. As a comparative example, a deinked pulp was prepared by the same procedure except that the mechanical process using a rotary disintegrator was omitted.

<Preparation of a Waste Paper Slurry (Disintegration in a Pulper)>

In a high-consistency pulper (from AIKAWA IRON WORKS CO., LTD.), the printed waste paper described above was disintegrated in water. The disintegration took place at 45° C. for 15 minutes to give a waste paper slurry (solids content: 15%). During the disintegration, 9.2 kg of NaOH, 5.0 kg of $Na_2SiO_3$, 2.8 kg of hydrogen peroxide, and 1.2 kg of a deinking agent were added per ton of pulp. Then, the waste paper slurry was further treated using PEA pulper (strainer hole size: 7.5 mm; basket hole size: 2.5 mm; from AIKAWA IRON WORKS CO., LTD.).

<Detrashing by Screens>

After the treatment in the pulper, contaminants were removed using coarse screens (S/C) (the solids content of the slurry: about 3%; slot velocity: 1 m/sec; reject ratio: 12 v/v %). In this experiment, a combination of two coarse screens in cascade was used to remove contaminants. Thus, reject streams that could not pass through a primary coarse screen (slot width: 0.2 mm) were treated using a secondary coarse screen (slot width: 0.2 mm), and accept streams that passed through the secondary coarse screen were returned to the inlet of the primary coarse screen and treated.

<Mechanical Process Using a Rotary Disintegrator (TF Processing)>

The detrashed slurry was processed in a rotary disintegrator. Specifically, the waste paper slurry was mechanically pro- <Evaluation of the Deinked Pulps>

Each of the resulting deinked pulps was used to prepare a handsheet having a basis weight of 60 g/m² according to JIS P 8222, which was analyzed for its ISO brightness and ash content.

Further, the handsheet obtained as described above was analyzed for its dirt count and dirt area using an image analyzer (EasyScan from Nippon Paper Unitec Co., Ltd.). Dirt particles were classified into three groups based on the size (those having a diameter of greater than 100 μm, a diameter of greater than 250 μm, and a diameter of greater than 350 μm) and each group was analyzed, wherein the dirt count represents the number of dirt particles per m², and the dirt area represents the sum of dirt areas (mm²) per m².

TABLE 2

Evaluation of deinked pulps

| | | Ash content (%) | Dirt count | | | Dirt area | | |
|---|---|---|---|---|---|---|---|---|
| | | | >φ100 μm | >φ250 μm | >φ350 μm | >φ100 μm | >φ250 μm | >φ350 μm |
| Example (mechanically processed) | Before flotation | 15.2 | 2350000 | 314000 | 91300 | 65700 | 27800 | 12800 |
| | After flotation | 8.5 | 209000 | 17600 | 4300 | 4800 | 1500 | 600 |
| Comparative example (not mechanically processed) | Before flotation | 16.0 | 2120000 | 335000 | 127000 | 67400 | 34600 | 20400 |
| | After flotation | 8.6 | 270000 | 43300 | 17200 | 8600 | 4500 | 2800 | cessed using a high-speed rotary disintegrator having conical cutting blades (TopFiner from AIKAWA IRON WORKS CO., LTD., comprising stationary blades with outermost peripheral blades having a blade width of 0.8 mm, and rotating blades with outermost peripheral blades having a blade width of 4.5 mm) (throughput: 31 m³/hr; electricity consumption: 79 kWh/t; the pH of the waste paper slurry: about 11; the solids content of the waste paper slurry: about 2%). In this machine, cutting blades with narrow slots rotate at high speed so that the waste paper slurry is mechanically processed by hydrodynamic impact forces.

<Ink Removal>

Inks were removed from the mechanically processed sample as follows. Inks were removed from the mechanically processed waste paper slurry by flotation using a flotator (F/T, Hypercell flotator having an effective volume of 6.8 m³ from AIKAWA IRON WORKS CO., LTD.), and deinked pulp was collected. Flotation conditions are shown in the table below.

TABLE 1

Flotation in Experiment 1 (prints made with UV-curable inks)

| Experiment 1 | Air fraction (G/L) | Slurry consistency (%) | Slurry pH | Froth fraction (%) | Froth concentration (%) |
|---|---|---|---|---|---|
| Example (mechanically processed) | 3.4 | 0.87 | 10.6 | 20.1 | 1.7 |
| Comparative example (not mechanically processed) | 3.4 | 0.85 | 9.9 | 17.7 | 1.6 |

Air fraction (G/L): Air feed flow rate × Residence time/Effective volume of the flotator (about 6.8 m³).

Froth fraction: the weight ratio of contaminants (froth) removed to the outside by flotation.

Froth concentration: the concentration of contaminants removed to the outside.

Slurry consistency: the consistency of the waste paper slurry in the flotator.

Slurry pH: the pH of the waste paper slurry after flotation.

Experiment 2

A deinked pulp was prepared using printed waste paper containing prints made with different UV-curable inks from those of Experiment 1, and made into paper.

This experiment was performed in the same manner as in Experiment 1 except that printed waste paper containing prints made with UV-curable inks suitable for recycling (colored woodfree waste paper from Matsuoka Resources) was used as a raw material and that reject streams that could not pass through a primary coarse screen were treated using a secondary coarse screen and accept streams were directed to the outlet of the primary coarse screen (forward process). As a comparative example, a deinked pulp was prepared by the same procedure except that the mechanical process using a rotary disintegrator was omitted.

TABLE 3

Flotation in Experiment 2 (prints made with UV-curable inks suitable for recycling)

| Experiment 2 | Air fraction (G/L) | Slurry consistency (%) | Slurry pH | Froth fraction (%) | Froth concentration (%) |
|---|---|---|---|---|---|
| Example (mechanically processed) | 2.3 | 0.97 | 10.7 | 17.3 | 1.4 |
| Comparative example (not mechanically processed) | 2.2 | 0.90 | 10.5 | 15.8 | 1.3 |

Air fraction (G/L): Air feed flow rate × Residence time/Effective volume of the flotator (about 6.8 m³).

Froth fraction: the weight ratio of contaminants (froth) removed to the outside by flotation.

Froth concentration: the concentration of contaminants removed to the outside.

Slurry consistency: the consistency of the waste paper slurry in the flotator.

Slurry pH: the pH of the waste paper slurry after flotation.

TABLE 4

| | | Ash content | Dirt count | | | Dirt area | | |
|---|---|---|---|---|---|---|---|---|
| | | (%) | >φ100 μm | >φ250 μm | >φ350 μm | >φ100 μm | >φ250 μm | >φ350 μm |
| Example (mechanically processed) | Before flotation | 20.4 | 1700000 | 80000 | 12800 | 31600 | 6000 | 1600 |
| | After flotation | 14.0 | 532000 | 22400 | 2900 | 9300 | 1600 | 400 |
| Comparative example (not mechanically processed) | Before flotation | 17.5 | 1520000 | 122000 | 35300 | 33500 | 10900 | 5100 |
| | After flotation | 15.8 | 575000 | 57200 | 17500 | 13600 | 5200 | 2500 |

As shown in the tables, the deinked pulps prepared by applying a mechanical process using a rotary disintegrator exhibited significantly lower dirt counts and dirt areas as compared with the deinked pulps prepared without applying a mechanical process using a rotary disintegrator.

It was also shown that when a mechanical process using a rotary disintegrator was performed, the number of dirt particles having a large diameter decreased while dirt particles having a small diameter increased at a stage before flotation, demonstrating that the mechanical process had an ink pulverizing effect. Further, it was shown that the dirt area decreases by the mechanical process according to the present invention.

The invention claimed is:

1. A process for preparing a deinked pulp, comprising the steps of:
disintegrating printed waste paper containing UV prints in water to give a waste paper slurry; and
applying a mechanical process to the waste paper slurry having a solids content of 0.5 to 5.0% by weight using a rotary disintegrator;
wherein the rotary disintegrator comprises stationary blades and rotating blades, so that inks can be detached/pulverized from a waste paper pulp when a feed stream passes between the stationary blades and the rotating blades, and
wherein the rotating blades have a blade width of 1.0 to 10 mm, and the stationary blades have a blade width of 0.3 to 2.0 mm.

2. The process of claim 1, comprising removing inks to the outside by flotation before the step of applying a mechanical process.

3. A process for making paper, comprising converting a raw material containing the deinked pulp prepared by the process of claim 1 into paper.

4. A process for making paper, comprising converting a raw material containing the deinked pulp prepared by the process of claim 2 into paper.

5. The process of claim 1, wherein the rotating blades have a blade width of 1.2 to 5.0 mm, and the stationary blades have a blade width of 0.5 to 1.4 mm.

6. The process of claim 1, wherein the rotating blades have a conical shape.

7. The process of claim 1, wherein the mechanical process is applied at 5 to 80° C.

* * * * *